United States Patent
Leleve et al.

(10) Patent No.: US 8,063,935 B2
(45) Date of Patent: Nov. 22, 2011

(54) METHOD FOR THE EARLY DETECTION OF THE ARRIVAL OF A MOTOR VEHICLE IN A DARK SECTOR

(75) Inventors: Joël Leleve, Bobigny (FR); Abdelaziz Bensrhair, Bobigny (FR); Julien Rebut, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 1637 days.

(21) Appl. No.: 11/395,891

(22) Filed: Mar. 30, 2006

(65) Prior Publication Data

US 2006/0222208 A1 Oct. 5, 2006

(30) Foreign Application Priority Data

Mar. 31, 2005 (FR) ..................................... 05 03168

(51) Int. Cl.
*H04N 7/18* (2006.01)
*H01K 7/00* (2006.01)
(52) U.S. Cl. ........................... 348/148; 348/155; 315/76
(58) Field of Classification Search .................. 348/148, 348/155, 169–172; 315/76–84; 382/103
See application file for complete search history.

(56) References Cited

U.S. PATENT DOCUMENTS

| | | | |
|---|---|---|---|
| 6,343,869 B1* | 2/2002 | Kobayashi | 362/37 |
| 6,379,013 B1* | 4/2002 | Bechtel et al. | 359/604 |
| 6,677,986 B1* | 1/2004 | Pochmuller | 348/149 |
| 6,900,594 B1* | 5/2005 | Reichert et al. | 315/83 |
| 7,526,100 B1* | 4/2009 | Hartman et al. | 382/103 |
| 2003/0001508 A1* | 1/2003 | Leleve | 315/77 |
| 2003/0007074 A1* | 1/2003 | Nagaoka et al. | 348/148 |
| 2003/0138132 A1* | 7/2003 | Stam et al. | 382/104 |
| 2004/0141057 A1* | 7/2004 | Pallaro et al. | 348/148 |

FOREIGN PATENT DOCUMENTS

| | | |
|---|---|---|
| DE | 197 04 818 | 8/1997 |
| EP | 1 019 267 | 6/2003 |
| JP | 60 240545 | 11/1985 |

OTHER PUBLICATIONS

Search Report for corresponding FR 06 03 168, dated Jul. 28, 2005.
European Patent Office, Patent Abstracts of Japan for JP 60 240545.
DIALOG English Abstract for EP 1 019 267.
DIALOG English Abstract for DE 197 04 818.
Cucchiara et al., "Detecting Moving Objects, Ghosts, and Shadows in Video Streams", IEEE Transationcs on Pattern Analysis and Machine Intelligence, vol. 25, No. 10, Oct. 2003.
Lee et al., "Multi-Frame Ship Detection and Tracking in an Infrared Image Sequence", Pattern Recognition, vol. 23, No, 7, pp. 785-798, 1990.
Tissainayagam et al.,"Visual tracking with automatic motion model switching", Pattern Recognition, vol. 34, 2001, pp. 641-660.

* cited by examiner

*Primary Examiner* — Tuan Ho
*Assistant Examiner* — Christopher K Peterson
(74) *Attorney, Agent, or Firm* — Locke Lord LLP

(57) ABSTRACT

The present invention relates in particular to a method for the early detection of the arrival of a motor vehicle in a dark sector. In general terms, the invention proposes to use a camera for early detection of the arrival of the vehicle in a dark area, for example a tunnel. For this purpose, in the invention, provision is made in particular for using an image processing application for determining on a set of images supplied by the camera, whether the vehicle is ready to enter a dark area and, if it turns out that the vehicle will enter a dark area, to cause a switching on of the lights. Particular embodiments of the method according to the invention also make it possible to dispense with storing a plurality of templates corresponding to the various shapes of tunnel entrances, by providing judicious and reliable recognition criteria.

19 Claims, 2 Drawing Sheets

METHOD FOR THE EARLY DETECTION OF THE ARRIVAL OF A MOTOR VEHICLE IN A DARK SECTOR

FIELD OF THE INVENTION

One object of the present invention is a method for the early detection of the arrival of a motor vehicle in a dark sector. Another object is any motor vehicle able to use such a method. The aim of the invention is essentially to propose a solution for enabling a driver to arrive in a dark sector with headlight devices in operation, so that he is not embarrassed, even for a short instant, by a difference in luminosity existing between a bright sector from which he is arriving and a dark sector which he is entering.

The field of the invention is, in general terms, that of motor vehicle lights. In this field, various types of light are known, amongst which there are essentially parking lights, passing, or dipped, lights, long-range main-beam lights, improved lights, referred to as dual mode, which combine the functions of dipped and main-beam lights by incorporating a removable shield, fog lights, signalling lights, etc. For all these lighting devices, traditionally, use has been made of light sources of the halogen lamp type, or discharge lamps; moreover, for several years, light emitting diodes have developed considerably, which makes it possible to also use them in a good number of lighting devices.

The present invention will be more particularly illustrated in the case where it is the switching on of the main beams which is recommended for entering a dark sector; the principle of the invention can however be transposed without difficulty to cause the switching on of any other lighting device in an early fashion when entering a dark sector.

BACKGROUND OF THE INVENTION

At the present time, many functionalities are associated with the various type of lighting devices. Amongst these functionalities there are for example a capacity for movement for certain lights, in particular used when the motor vehicle is taking a bend, to illuminate in an optimum fashion the path followed by the vehicle in the bend; there are also found an ability of certain dual-mode headlights to switch automatically between the use of the dipped beams and the use of the main beams, in order in particular to avoid dazzling the drivers being passed. There is also found an ability of certain light devices, usually the dipped lights, to switch on automatically when the external luminosity conditions require a switching on of the lights, in particular when the motor vehicle has entered a tunnel.

The solutions existing for the latter functionality are essentially based on the use of photodiodes. The latter make it possible to detect an external luminosity level; a tunnel, even illuminated by artificial light sources, does not have a luminosity comparable with that of the natural light in daylight. The use of a single photodiode therefore makes it possible to cause the switching on of the headlight devices once the vehicle has entered the tunnel.

However, it is impossible with such equipment to anticipate the switching on of the lights so that the vehicle arrives in the tunnel with its headlight devices already switched on. Such a solution for automatic switching on of the lights, based on the use of a single photodiode, therefore poses a certain number of problems. This is because the fact that it is not possible to anticipate the switching on of the lighting devices when arriving in a tunnel has the consequence that the driver, on entering the tunnel in question, has reduced visibility until the lighting devices are switched on, a switching on which, typically, takes a second, the conventional reaction time of a photodiode. However, the travel time of one second corresponds, for an average speed of 90 kilometers per hour, to a distance travelled of 25 meters, a not insignificant distance under non-optimal visibility conditions. Moreover, when the lighting devices which are switched on use light sources of the xenon type, it is necessary to add to the reaction time of the photodiodes a stabilization time for the light flux emitted by the lighting device before having satisfactory illumination available.

In the prior art, a solution was proposed for causing early switching on of the lighting devices, the switching on occurring before the vehicle enters the tunnel in question. Such a solution involves a set of three photodiodes: a first photodiode points towards the sky; a second photodiode points towards the front of the vehicle, and therefore in certain cases towards the tunnel; and a third photodiode points towards an intermediate region. The appearance of a tunnel facing the vehicle then results in characteristic signals generated by the three photodiodes. However, the characteristic signals thus generated can be interpreted as the imminent arrival in a tunnel only if these signals coincide with a known template, which must be stored in advance; however, because of the great variety existing in the forms of tunnel entrance, it is then essential to store an enormous amount of information, in order to take account of as many templates as there exist different forms of tunnel entrances. Moreover, the directivity of the photodiodes does not make it possible, or makes it possible too late, to allow early switching on of lighting devices, to detect a tunnel placed at the exit from a bend. Finally, equipping a vehicle with equipment dedicated to the early detection of tunnels—two additional photodiodes compared with normal equipment limited to a single photodiode—represents a not insignificant cost.

SUMMARY OF THE INVENTION

The object of the invention proposes a solution to the problems and drawbacks that have just been disclosed. In general terms, the invention proposes to use a camera, equipment that is more and more often present in motor vehicles in particular to allow functionalities of the "night vision" type, to detect early an arrival of the vehicle in a dark sector, for example a tunnel. To this end, in the invention, provision is made in particular for using an image processing application in order to determine, on a set of images supplied by the camera, whether the vehicle is about to enter a dark area and to cause, if it turns out that the vehicle will actually enter a dark sector, switching on of the lights.

Such a cooperation between the image processing means and a triggering of the switching on of lighting devices makes it possible to dispense with the presence of a plurality of photodiodes, whilst allowing the location of a dark sector placed for example on a bend. Particular embodiments of the method according to the invention also make it possible to dispense with storing pluralities of templates corresponding to the various forms of tunnel entrances, by providing judicious and reliable recognition criteria.

The invention therefore concerns essentially a method for the early detection of the arrival of a motor vehicle in a dark sector, the said method being implemented within the motor vehicle comprising in particular a camera, computer processing means and a set of lighting devices, passing through the said sector requiring the switching on of at least one of the motor vehicle lighting devices. In accordance with the invention, the method comprises the various steps consisting of:

implementing an image processing application on a set of images supplied by the camera in order to determine the imminent arrival of the vehicle in the dark sector; the said application comprising the substeps of:

identifying, on a first image supplied by the camera, at least one dark object liable to correspond to the dark sector;

analyzing, on following images supplied by the camera, a change in each dark object identified; and where applicable causing the switching on of at least one of the motor vehicle lighting devices.

The method according to the invention can comprise, in addition to the main characteristics that have just been mentioned in the previous paragraphs, one or more supplementary characteristics amongst the following:

the switching on of the lighting device is carried out at least one second before the arrival of the motor vehicle in the dark sector;

the operation of identifying at least one dark object comprises a thresholding operation carried out using a histogram of the first image;

the thresholding of the histogram carried out on the first image is a hysteresis thresholding;

the operation of analyzing the following images comprises an operation of analysing a change in the area of each dark object identified;

only the dark objects identified where the change in area is increasing are considered to be liable to correspond to the dark sector to be detected;

only the dark objects identified where the change in area is in accordance with a change law previously stored in the computer processing means of the motor vehicle are considered to be liable to correspond to the dark sector to be detected;

only the dark objects identified where a particular point observes a path directed towards the center of the image are considered to be liable to correspond to the dark sector to be detected;

only the dark objects identified where the area has reached a minimum value and for which the particular point observes a path directed towards the center of the image are considered to be liable to correspond to the dark sector to be detected;

only the dark objects identified where a particular point observes a path towards the center of the image at a speed correlated with the speed of the motor vehicle are considered to be liable to correspond to the dark sector to be detected;

for each dark object identified, the particular point is the center of gravity of the dark object in question;

the method comprises the additional step consisting of using a predictive filter for mitigating any disappearance of at least one of the dark objects identified out of a previously determined number of following images supplied by the camera;

the predictive filter is a Kalman filter;

the implementation of the image processing application is limited to a horizontal central band of the set of images supplied by the camera in order to determine an imminent arrival of the vehicle in the dark sector;

the lighting devices whose switching on is caused comprise at least one discharge lamp;

the lighting devices whose switching on is caused are dipped beams;

the dark sector is of the tunnel type;

the method comprises the various additional steps consisting of;

detecting the emergence of the vehicle from the dark sector;

where applicable, causing the switching off of at least one of the motor vehicle lighting devices;

the step of detecting the emergence of the vehicle out of the dark area is performed by analyzing a change in the camera closure time.

The present invention also relates to a motor vehicle able to implement the method for early detection of the arrival of a motor vehicle in a dark sector, the said method having the main characteristics and possibly one or more supplementary characteristics that have just been mentioned, the said motor vehicle comprising in particular a camera, computer processing means and a set of lighting devices, passing through the said sector requiring the switching on of at least one of the motor vehicle lighting devices. In accordance with the invention, the motor vehicle comprises in particular:

an image processing application applied to a set of images supplied by the camera in order to determine the imminent arrival of the vehicle in the dark sector;

means for the automatic switching on of at least one of the lighting devices following the determination of the imminent arrival of the motor vehicle in the dark sector.

The invention and its various applications will be understood better from a reading of the following description and an examination of the figures that accompany it.

BRIEF DESCRIPTION OF THE FIGURES

These are presented only by way of indication and are no way limiting of the invention.

DESCRIPTION OF PREFERRED EMBODIMENTS OF THE INVENTION

Figure 1A:
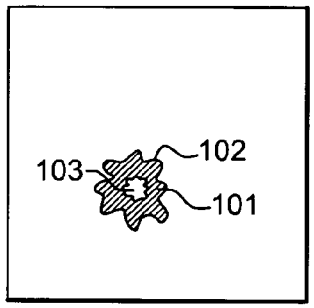
FIGS. 1A to 1C show a schematic representation of segmentations by thresholding occurring in various example embodiments of the method according to the invention in order to identify dark objects liable to correspond to a dark sector to be detected.

The various elements appearing in several figures will, unless otherwise stated, have the same reference numeral.

More and more vehicles are now equipped with a camera, the use of which is today principally a night driving aid, by offering the driver, on a monitoring screen and in real time, a clear image of a road that he is following at night, in particular by virtue of the use of infrared signals. Thus an essential idea of the invention is to take advantage of the presence of a camera on board certain vehicles in order to detect, in an early fashion, the arrival of the motor vehicle in a dark sector. Such an early detection then makes it possible to cause the switching on of lighting devices before the vehicle enters the dark sector in question. To this end, an image processing application is used.

In the examples that have just been described, it is possible to distinguish essentially two phases in the process of determining the imminent entry of the vehicle into a dark sector. A first phase consists of the selection, on the image, of dark objects, which become candidate objects liable to constitute a dark sector to be detected. A second phase then consists of following the dark objects selected over time, applying one or more discriminating criteria, in order finally to keep only one dark object corresponding to the dark sector which the vehicle is ready to enter, provided that such dark sector exists.

Figure 1B:
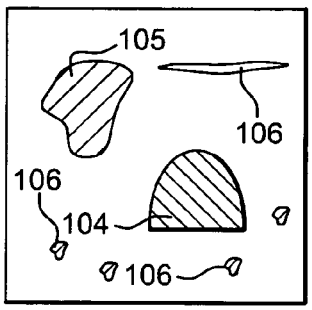
Figure 1C:
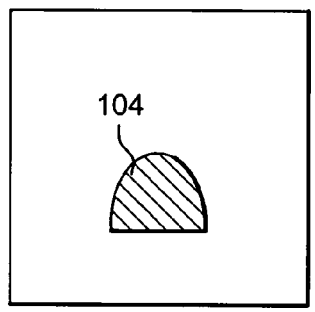

FIGS. 1A, 1B and 1C illustrate various examples of implementation of the first phase of the method according to the invention; they show schematically, respectively, the results obtained by various segmentation operations performed on an image supplied by the camera on board the vehicle. The segmentation is here an operation consisting of extracting solely dark areas of the image; to this end, it is proposed in particular to use a grey-level histogram of the image, and to perform a thresholding thereon; the grey-level histogram corresponds to a representation of the distribution of the light intensity of the image, in which the grey-level values are entered on the x axis and, on the y axis, for each grey-level, the number of points in the image having the intensity corresponding to this level. Such a histogram can, in the majority of cases, be approximated by a sum of Gaussians.

Thus FIG. 1A shows an example in which a strong threshold has been used for carrying out the segmentation of a first image supplied by the camera. Use of a strong threshold means the fact that a small quantity of pixels of the image to be segmented have been retained, these pixels corresponding to the darkest pixels. In this way a first dark object 101 is obtained, hatched in FIG. 1A. The use of a strong threshold makes it possible to obtain clearly located dark objects, well identifiable separately, but not very closed, as testified to by the presence of an irregular contour 102 and the presence of non-retained pixels 103 in the very interior of the overall shape of the first dark object 101.

FIG. 1B shows an example in which a weak threshold has been used for carrying out the segmentation of a first image supplied by the camera. Use of a weak threshold means the fact that a relatively large quantity of pixels in the image to be segmented have been retained, these pixels always corresponding to the darkest pixels. In this way a second dark object 104 and a third dark object 105 are obtained, hatched in FIG. 1B. The use of a weak threshold makes it possible to obtain dark objects that are well closed, but affected by noise, represented here in particular by the third dark object 105 and by other scattered pixels 106 retained.

FIG. 1C shows an example in which a hysteresis thresholding has been used. The latter thresholding makes it possible obtain optimum results in terms of the precise selection of dark objects, by eliminating the noise corresponding to the isolated dark pixels in the image, whilst ensuring the closure of the dark object selected, a closure which subsequently facilitates the monitoring of the change in the said dark objects. Hysteresis thresholding consists of preserving the correct identification and location of dark objects obtained by means of a strong threshold, as illustrated in FIG. 1A, whilst profiting from the good closure of these dark objects obtained by means of a weaker threshold as illustrated in FIG. 1B. To this end, a conditional dilatation of the dark objects in the binary image issuing from the processing by means of the strong threshold is carried out, a conditional dilatation formed with respect to the delimitations of the corresponding dark objects of the binary image issuing from the processing by means of the weak threshold. Thus the size of the dark objects issuing from the strong thresholding is increased without exceeding their size in the image issuing from the weak thresholding.

In the example depicted in FIG. 1C, the starting point is the first dark object 101 in FIG. 1A, which is caused to undergo a conditional dilatation relative to the second dark object 104 in FIG. 1B. Finally, at the end of this segmentation operation using a hysteresis thresholding method, there is obtained a single object corresponding to the second dark object 104. Thus, in general terms, by this method well closed dark objects were obtained whose change over time will be easy to monitor, whilst being free from the noise generated by the use of an excessively weak threshold.

After the phase of selection, on a first image, of dark objects, it is proposed, in various example embodiments of the method according to the invention, to apply one or more discriminating criteria in order, over time, to eliminate some—sometimes all—dark objects selected in order, in the case where such exists, to keep only the dark object corresponding to the dark sector which the vehicle is preparing to enter, and consequently cause the switching on of the lighting devices. Then a monitoring is carried out over time of the change in each dark object selected, on the images which follow the first image from which the dark objects to be monitored were extracted. Naturally, in the method according to the invention, during the monitoring of the various dark objects, new dark objects may appear on following images, these new dark objects then being able to be effectively selected as dark objects and in their turn be the subject of a monitoring of change.

Figure 2A:
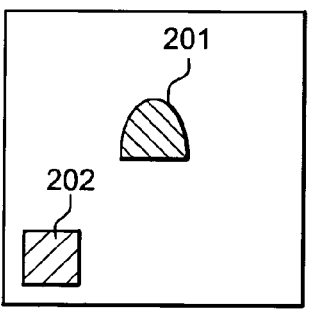
FIGS. 2A to 2C show a schematic representation of the monitoring of a dark object detected by an image processing application occurring in an example embodiment of the method according to the invention.
Figure 2B:
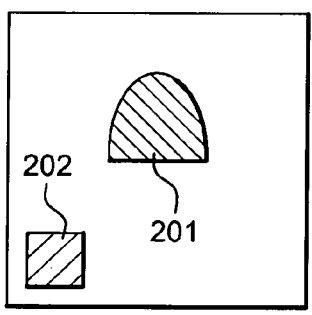
Figure 2C:
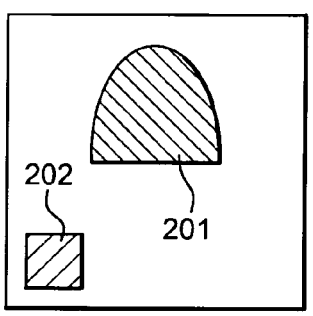

A first discriminating criterion that it is proposed to use in the method according to the invention is a criterion that is directly related to the change in the area of each dark object select. FIGS. 2A to 2C illustrate this selection criterion. In these figures, a first dark object 201 and a second dark object 202 have been selected in a first phase; FIGS. 2A, 2B and 2C show the change in the size of the dark objects 201 and 202 over time. In general terms, the matching of the same dark object from one image to another can be carried out for example using a calculation method consisting of minimizing a Euclidean distance.

As can be noted, the first dark object 201, which manifestly corresponds to a tunnel which the motor vehicle is ready to enter, is characterized by an area which increases over time. On the other hand the second dark object 202, which manifestly corresponds to another vehicle travelling in front of and to the left of the vehicle containing the camera and at a speed comparable to the latter, is characterized by an area which is relatively stable over time. In the method according to the invention only the first dark object 201 will be kept as an object liable to correspond to a dark sector into which the vehicle may enter and requiring an early switching on of the lighting devices.

The motor vehicle in question comprises computer processing means, preferably including at least one memory module. Advantageously, in the invention, it is proposed to store one or more growth laws, for example of the type depicted schematically in FIG. 3. This figure depicts a curve 301 corresponding to a mathematical model of the increase in the area—as perceived by the camera—of a dark sector which the vehicle is waiting to enter, according to the distance separating the said vehicle from the entry into the dark sector in question. The y-axis therefore corresponds to the percentage of the area occupied by the dark sector in question compared with the whole of the surface area of the image. The x-axis for its part corresponds to the measurement of the distance, in meters, separating the vehicle from the dark area.

Figure 3:
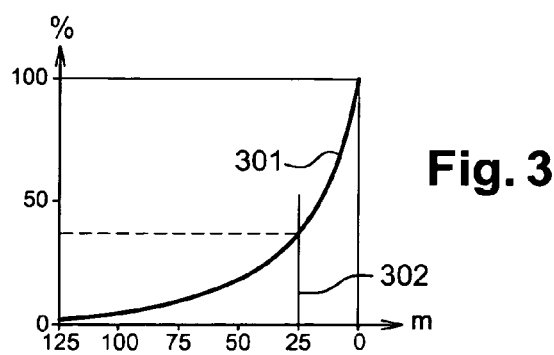
FIG. 3 shows an example of a growth law for a dark object used in an example implementation of the method according to the invention.

When the change in the area of a dark object selected follows—at least approximately—a law of the type shown in FIG. 3, close to an exponential function, it is decided, in the method according to the invention, to cause the switching on of the lighting devices. This switching on can for example be caused at a distance of 25 meters, marked in FIG. 3 by a vertical line 302, a distance which, for a speed of the vehicle of 90 kilometers per hour, makes it possible to benefit from the switching on of the lights one second before entering the dark sector. At such a distance, the area occupied by the representation of the dark sector corresponds approximately to one-third of the total area of the image. In a particular embodiment of the invention, provision is made by way of example to take account of the speed of the vehicle in order to determine at what distance from the dark sector it is necessary to trigger the switching on of the lighting devices, an early triggering of one second being satisfactory in all cases.

Figure 4A:
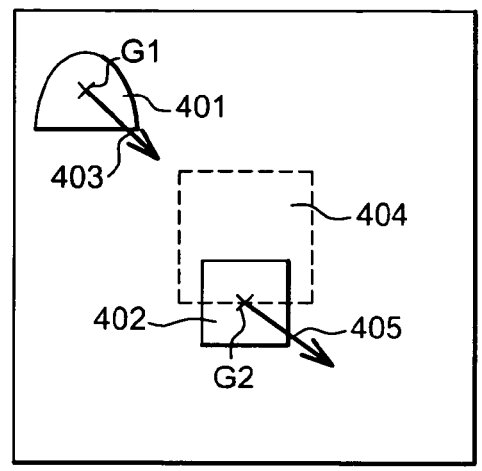
FIGS. 4A to 4C show a schematic representation of the monitoring of two dark objects detected by an image processing application acting in an example embodiment of the method according to the invention.
Figure 4B:
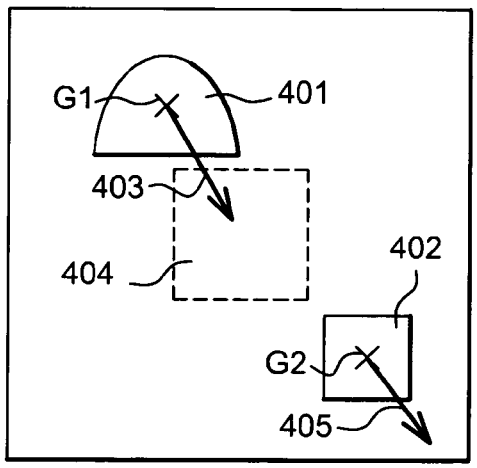
Figure 4C:
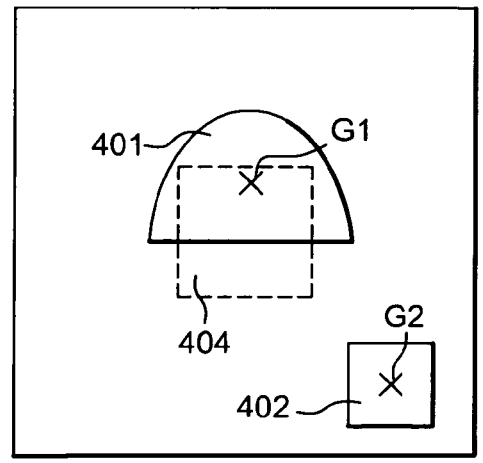

A second discriminating criterion that it is proposed to used in the method according to the invention is a criterion which is directly related to the direction of movement of each dark object selected. FIGS. 4A to 4C illustrate this selection criterion. In these figures, a first dark object 401 and a second dark object 402 have been selected in a first phase; FIGS. 4A, 4B and 4C, show the change in the dark object 401 and 402 over time, being concerned more particularly with their path. As can be seen, the first dark object 401, which manifestly corresponds to a tunnel which the motor vehicle is ready to enter, is characterized by the fact that it is moving progressing towards a central part 404 of the image.

Such an observation can be made by locating the change in any point on the first dark object, for example its center of gravity G1, and denoting its movement between two consecutive images by means of a first arrow 403. On the other hand, the second dark object 402, which manifestly corresponds to another vehicle travelling in front of and to the right of the vehicle containing the camera, is characterized by the fact it is progressively moving away from the central part 404 of the image, as illustrated by means of a second arrow 405 specifying the orientation and direction of movement of the center of gravity G2 of the second dark object 402. In the method according to the invention, only the first dark object 401 will count as being liable to correspond to a dark sector in which the vehicle may enter and requiring early switching on of the lighting devices.

In a particular embodiment of the invention, it is proposed to correlate the speed of the vehicle equipped with a camera with a speed of movement of a given dark object towards the central part of the image in order to determine whether the dark object in question is actually liable to correspond to a dark sector that the vehicle will enter.

The operation of analyzing the change in the path of the various dark objects previously selected may, in order to limit the calculations on the image processing applications used, take place only for dark objects that have reached a certain area in the segmented image.

In a particular embodiment of the method according to the invention it is proposed to use a predictive filter. Such a use may prove to be advantageous in particular circumstances, the consequence of which is the disappearance, during a few images, of a dark object being monitored. Such a particular circumstance may for example correspond to the case where the vehicle equipped with a camera is overtaken by a second vehicle, a distant dark sector then being temporarily obscured during the phase during which the second vehicle moves in. A dark object thus lost may be recognized, and recovered, on the following images by using a predictive filter; the role of such a filter is to give, from past changes, the expected change in the dark object temporarily hidden. Thus, when the latter reappears, a comparison between its position once again visible and the position at which it was expected makes it possible to recognize it as the dark object that previously disappeared, and to pursue the necessary calculations. For example, the predictive filter may be of the Kalman filter type, which is a predictive/corrective filter known in the prior art. Such a predictive filter can also be used for eliminating the dark objects selected which in fact correspond only to noise on the segmented image, such objects not having any correspondence in time.

In a particular example, the calculations of the image processing application are limited, both for the phase of selecting dark objects and for the phase of monitoring the change in these dark objects, to a horizontally centered band of the images to be analyzed. Typically, the central band can cover half of the image to be analyzed.

In a particular example of the invention, provision is made for causing an automatic switching off of the lighting devices, which would have been switched on early following the implementation of the invention, once the vehicle has left the dark sector in question. To this end, it is proposed for example to use as a decision parameter the time of obscuring of the camera when the latter is of the CCD type. This is because the obscuring time is regulated automatically by the camera, and depends on the ambient lighting. It can therefore be used directly for detecting that the vehicle has left the dark sector. Information supplied by the camera obscuring time can moreover also be used when the vehicle enters a dark sector in order to confirm such an entering; if, for any reason, the lighting devices have not been switched on early before entering the dark sector, the information supplied by the camera obscuring time then makes it possible to remedy this situation by triggering the switching on of lighting devices.

What is claimed is:

1. A method for the early detection of the arrival in a dark sector of a motor vehicle having a camera, a computer processor and a set of lighting devices which may be selectively switched on or off, the method comprising the steps of:
   (a) implementing an image processing application on a set of images supplied by the camera to determine the imminent arrival of the vehicle in the dark sector; the application comprising the substeps of:
      (i) identifying, on a first image supplied by the camera, at least one dark object liable to correspond to the dark sector;
      (ii) analyzing, on following images supplied by the camera, a change in each dark object identified;
   (b) using a predictive filter for mitigating any disappearance of at least one of the dark objects identified out of a previously determined number of following images supplied by the camera; and
   (c) switching on at least one of the motor vehicle lighting devices following the determination of the imminent arrival of the motor vehicle in the dark sector.

2. The method according to claim 1, wherein the switching on of the lighting device is carried out at least one second before the arrival of the motor vehicle in the dark sector.

3. The method according to claim 1, wherein the operation of identifying at least one dark object comprises a thresholding operation carried out using a histogram of the first image.

4. The method according to claim 3, wherein the thresholding of the histogram carried out on the first image is a hysteresis thresholding.

5. The method according to claim 1, wherein the operation of analyzing the following images comprises an operation of analyzing a change in the area of each dark object identified.

6. The method according to claim 5, wherein only the dark objects identified where the change in area is increasing are considered to be liable to correspond to the dark sector to be detected.

7. The method according to claim 5, wherein only the dark objects identified where the change in area is in accordance with a change law previously stored in the computer processor of the motor vehicle are considered to be liable to correspond to the dark sector to be detected.

8. The method according to claim 1, wherein only the dark objects identified where a particular point observes a path directed towards the center of the image are considered to be liable to correspond to the dark sector to be detected.

9. The method according to claim 8, wherein only the dark objects identified where the area has reached a minimum value and for which the particular point observes a path directed towards the center of the image are considered to be liable to correspond to the dark sector to be detected.

10. The method according to claim 8, wherein only the dark objects identified where a particular point observes a path towards the center of the image at a speed correlated with the speed of the motor vehicle are considered to be liable to correspond to the dark sector to be detected.

11. The method according to claim 8, wherein, for each dark object identified, the particular point is the center of gravity of the dark object in question.

12. The method according to claim 1, wherein the predictive filter is a Kalman filter.

13. The method according to claim 1, wherein the implementation of the image processing application is limited to a horizontal central band of the set of images supplied by the camera in order to determine an imminent arrival of the vehicle in the dark sector.

14. The method according to claim 1, wherein the lighting devices comprise at least one discharge lamp.

15. The method according to claim 1, wherein the lighting devices comprise dipped beams.

16. The method according to claim 1, wherein the dark sector is a tunnel.

17. The method according to claim 1, further comprising the steps of:
    (a) detecting the emergence of the vehicle from the dark sector; and
    (b) where applicable, switching off of at least one of the motor vehicle lighting devices.

18. The method according to claim 17, wherein the step of detecting the emergence of the vehicle out of the dark area is performed by analyzing a change in the camera closure time.

19. A motor vehicle able to implement the method according to claim 1, for early detection of arrival of a motor vehicle in a dark sector, the motor vehicle comprising:
    (a) a camera;
    (b) a computer processor;
    (c) a set of lighting devices which may be selectively switched on or off;
    (d) an image processing application applied to a set of images supplied by the camera in order to determine the imminent arrival of the vehicle in the dark sector;
    (e) a predictive filter; and
    (f) a device that automatically switches on at least one of the lighting devices following the determination of the imminent arrival of the motor vehicle in the dark sector.

* * * * *